United States Patent
Sugahara

(10) Patent No.: US 9,638,298 B2
(45) Date of Patent: May 2, 2017

(54) METHOD AND DEVICE FOR CORRECTING FEED ERROR OF FEEDER

(71) Applicant: SK MACHINERY CO., LTD, Kanagawa (JP)

(72) Inventor: Sumio Sugahara, Kanagawa (JP)

(73) Assignee: SK MACHINERY CO., LTD., Kanagawa (JP)

(*) Notice: Subject to any disclaimer, the term of this patent is extended or adjusted under 35 U.S.C. 154(b) by 291 days.

(21) Appl. No.: 14/382,260

(22) PCT Filed: Mar. 8, 2013

(86) PCT No.: PCT/JP2013/056450
§ 371 (c)(1),
(2) Date: Aug. 29, 2014

(87) PCT Pub. No.: WO2013/137139
PCT Pub. Date: Sep. 19, 2013

(65) Prior Publication Data
US 2015/0300464 A1    Oct. 22, 2015

(30) Foreign Application Priority Data
Mar. 10, 2012 (JP) .................................. 2012053881

(51) Int. Cl.
*F16H 19/06* (2006.01)
*B25J 9/10* (2006.01)

(52) U.S. Cl.
CPC .............. *F16H 19/06* (2013.01); *B25J 9/104* (2013.01); *F16H 19/0672* (2013.01)

(58) Field of Classification Search
CPC ... A01B 12/006; F16H 19/06; F16H 19/0672; B25J 9/104
See application file for complete search history.

(56) References Cited

U.S. PATENT DOCUMENTS 4,280,669 A * 7/1981 Leanna ................. B65H 19/26
242/527.1
6,715,709 B2 * 4/2004 Stephens ............... B65H 18/20
242/533

(Continued)

FOREIGN PATENT DOCUMENTS

| JP | S60-197505 A | 10/1985 |
| JP | H05-346149 A | 12/1993 |

(Continued)

*Primary Examiner* — David M Fenstermacher
(74) *Attorney, Agent, or Firm* — Pearne & Gordon LLP

(57) ABSTRACT

The drive source of a feeder (111) is utilized to drive a feed error correction device for correcting error in feeding a moving body caused by extension of linear bodies (161A, 161B) of the feeder. With the feeder (111) running, when extension at or above a predetermined value occurs in the linear bodies (161A, 161B), a guide unit (171) including a driven rotating wheel (172) for the linear bodies tows (or displaces) through power received from the drive source of the feeder, bringing the linear bodies (161A, 161B) into a state of appropriate tension. The guide unit (171) receives transmission of power in one direction only and appropriately tows the linear bodies (161A, 161B), thereby cancelling extension of the linear bodies at or above the predetermined value.

5 Claims, 8 Drawing Sheets

(56) References Cited

U.S. PATENT DOCUMENTS

| | | | | |
|---|---|---|---|---|
| 6,805,316 B2* | 10/2004 | Wojcik | ............ | B26D 1/626 |
| | | | | 242/527.1 |
| 6,877,689 B2* | 4/2005 | Butterworth | ....... | B65H 19/2269 |
| | | | | 242/533.1 |
| 7,021,030 B1* | 4/2006 | Burns | ............ | B09B 3/00 |
| | | | | 242/538 |
| 7,175,127 B2* | 2/2007 | Butterworth | ....... | B65H 19/2269 |
| | | | | 242/533.1 |
| 7,238,236 B2* | 7/2007 | Wilks | ............ | B65H 19/29 |
| | | | | 118/117 |
| 7,597,282 B2* | 10/2009 | Endo | ............ | B65H 19/2215 |
| | | | | 242/527 |
| 7,746,010 B2* | 6/2010 | Sugahara | ............ | F16H 19/0622 |
| | | | | 318/280 |
| 8,056,702 B2 | 11/2011 | Sugahara | | |
| 2009/0127774 A1 | 5/2009 | Sugahara | | |

FOREIGN PATENT DOCUMENTS

| | | | |
|---|---|---|---|
| JP | 2003-237925 A | 8/2003 |
| JP | 2006-017292 A | 1/2006 |
| JP | 2007-127138 A | 5/2007 |
| JP | 2008-273702 A | 11/2008 |
| JP | 2009-204134 A | 9/2009 |
| JP | 2011-002004 A | 1/2011 |
| JP | 2011-038548 A | 2/2011 |
| JP | 2012-002297 A | 1/2012 |

* cited by examiner

FIG. 4
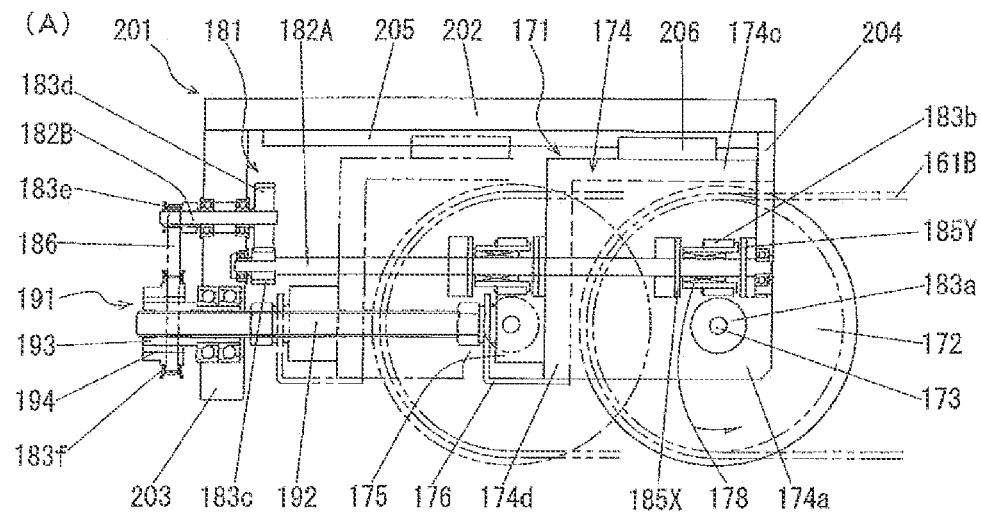
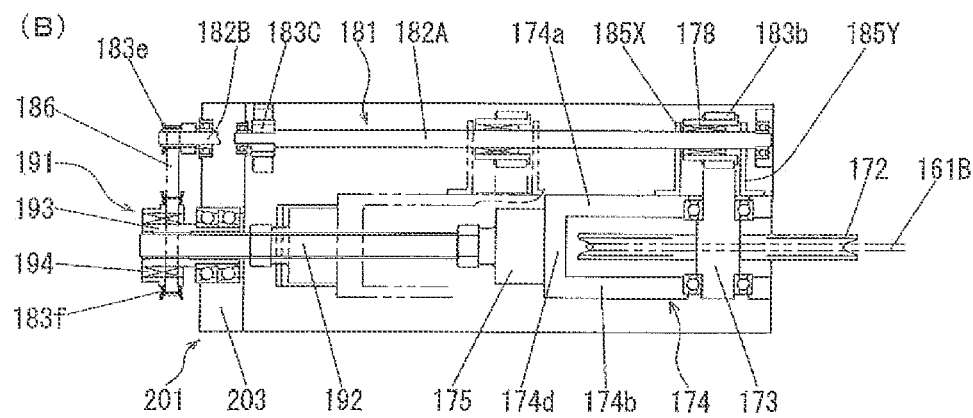
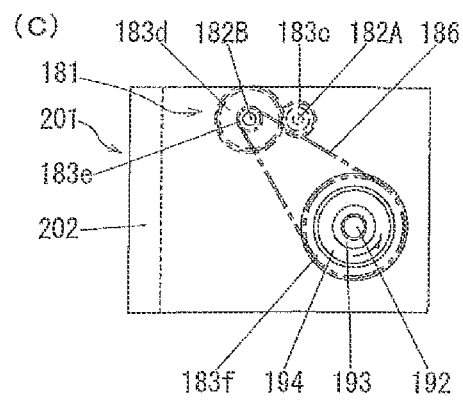 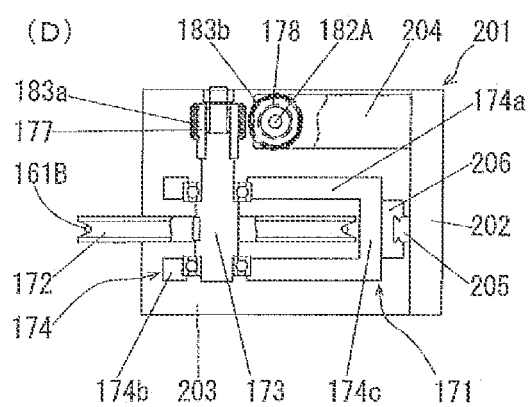

FIG. 8
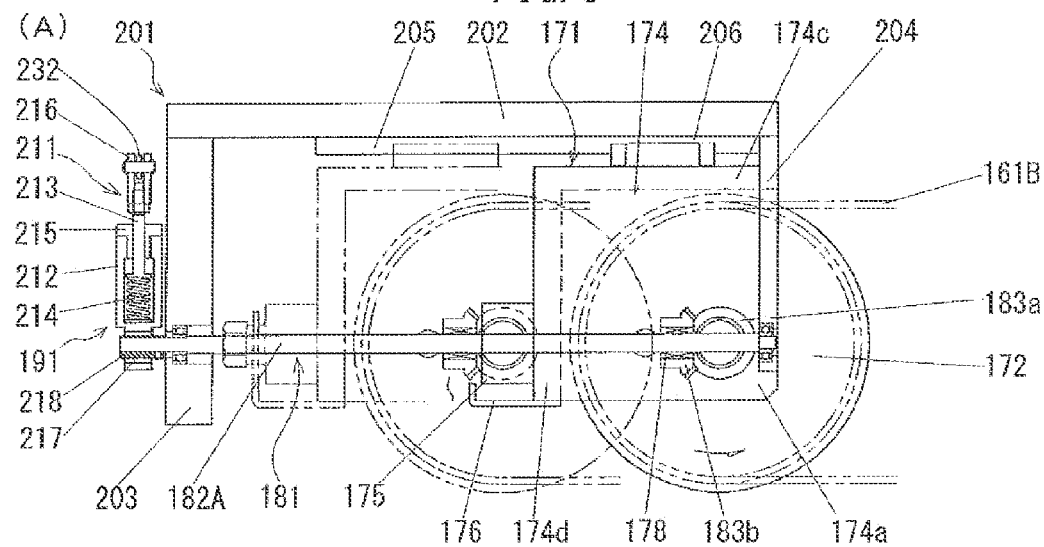
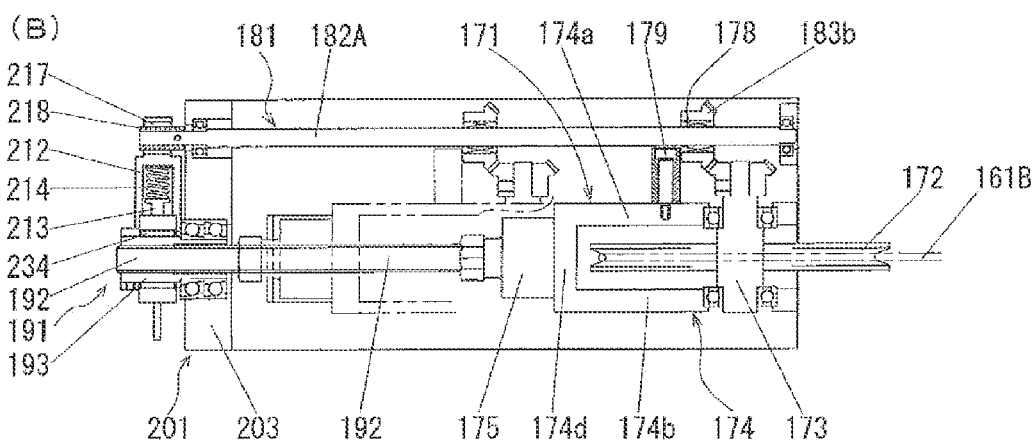
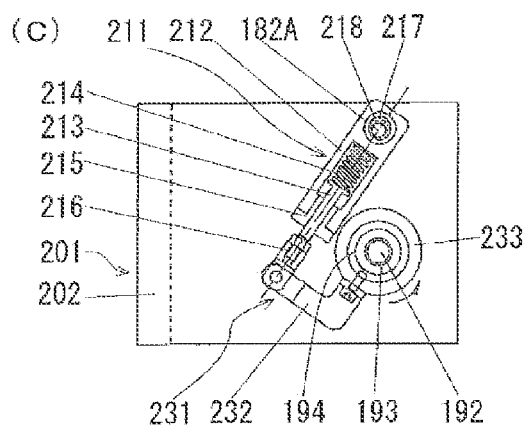
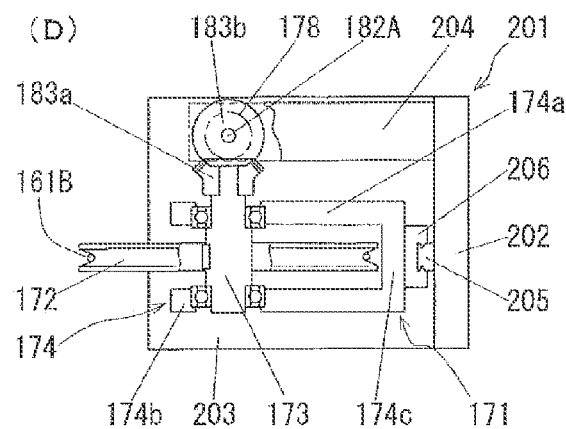

METHOD AND DEVICE FOR CORRECTING FEED ERROR OF FEEDER

TECHNICAL FIELD

The present invention relates to a feed error correction method and a feed error correction apparatus in a mechanical apparatus for transporting or moving people and/or objects (hereinafter termed a "feeder").

BACKGROUND ART

Numerous types of feeder are employed in order to transport or move people and/or objects, for example, belt conveyor feeder, screw-type feeder, cylinder-type feeder, timing belt-type feeder, lift-type feeder, industrial robots, and the like. Feeder of other types that can substitute for these feeder are disclosed in Patent Documents 1 to 5.

The feeders disclosed in Patent Documents 1 to 5 are of a design in which a moving body undergoes reciprocating motion as reeling apparatus alternately reels and unreels linear bodies connected to the moving body. In these documents, Patent Documents 1 and 2 are indicated to satisfy requirements as to positioning accuracy, long-distance transportation, remote transportation, controllability, high feed accuracy, high-speed feeding, low price, simplicity of configuration, space saving design, reduced weight, countermeasures against dust, safety measures against accidents, and the like. These feeder have additional desirable effects in terms of higher accuracy and improved durability, based on quieter and more stable operational status; more compact configuration; and higher accuracy and improved durability, based on proper reeling and unreeling of the linear bodies. The techniques disclosed in these documents are expected to contribute in the field of industrial robots and other technical fields.

In the feeder mentioned above, in cases in which it is desired to better ensure positioning accuracy controllability, high feed accuracy, and so on, the issue of extension of the linear bodies must be rigorously dealt with. Extension of linear bodies includes the widely-known types of "initial extension" and "elastic extension." Hereinbelow, after explaining the subject of this type of extension in linear bodies, relevant issues will be discussed.

"Initial extension" ordinarily occurs in an initial stage of use of a linear body (for example, a brand-new wire rope). The cause of this is thought to be due to the fact that the helical element wires or strands of such a brand-new linear body are not yet in a state of sufficiently close contact with one another. When a load is applied on a brand-new linear body, the element wires or strands contact with one another (a tightened state), initial extension commensurate with the tensing occurs. This initial extension is also termed "permanent extension," since the extension does not return to its original state even when unloaded. Due to the nature of initial extension, wire ropes composed of a large number of element wires, or fiber core wire ropes, tend to have greater initial extension. The extent of initial extension of linear bodies varies depending on the structure of the linear body as well. Consequently, initial extension of a linear body is also known as "structural extension." Initial extension typically arises in a low-load range of about 10-15% of a breaking load of the linear body. However, such extension can be reduced by several tens of percent by providing the linear body with tensile processing in the final stage of a twisting operation. However, in terms of processing technique, process duration, process cost, and the like, it is difficult to eliminate in advance 100% of the initial extension in brand-new linear bodies prior to actual use.

When a tensile load is applied on a linear body from which initial extension has been eliminated, elongation proportional to the load arises in the linear body. This is well-known elastic extension which satisfies Hooke's law. This elastic extension represents "transient extension" that substantially disappears when tensile load is no longer applied.

In some instances, the aforedescribed initial extension (permanent extension) and elastic extension of linear bodies may be ignored, depending on the intended use of the feeder. Also, the allowable range of the initial extension is broadened under the conditions in which the feeder will be used. On the other hand, in the case of an accurate feeder in which it is necessary for the moving body to be halted precisely at a predetermined location on a production line or assembly line, it is important to eliminate the influence from the initial extension and elastic extension as much as possible, and if this is not accomplished to a sufficient extent, feed accuracy is considerably diminished. As a countermeasure, the linear body may be shortened each time that the initial extension exceeds a certain value. However, this practice involves performing numerous steps, such as measurement, cutting, reconnection, and the like, on the linear body while installed in the apparatus, which makes it undesirable for practical purposes.

Patent Document 6 discloses means for correcting feed error caused by "elongation of the linear bodies" in a linear body-type feeder can be corrected. The technique disclosed in this document is desirable in terms of satisfying requirements such as controllability for the purposes of error correction, stability of the state of error correction, reliability of the state of error correction, safety of the system, ease of operation, demand responsiveness, space saving design, simplicity of configuration, ease of repair and inspection, low price, low running costs, establishment of automation, assurance of high feed accuracy with respect to the feed means, and so on.

PRIOR ART DOCUMENTS

Patent Documents

Patent Document 1: JP2006-017292A1
Patent Document 2: JP2007-127138A1
Patent Document 3: JP2009-204134A1
Patent Document 4: JP2011-002004A1
Patent Document 5: JP2011-038548A1
Patent Document 6: JP2012-002297A1

DISCLOSURE OF THE INVENTION

Problems to be Solved by the Invention

However, the error correction means disclosed in Patent Document 6 may give rise to problems such as the followings, when, for example, the error correction means is mechanically operated employing a drive source such an electric motor (motor) or hydraulic/pneumatic cylinder.

(1) Increased apparatus cost due to expenses associated with the electric motor (motor) or hydraulic/pneumatic cylinder drive source, and related components.

(2) Increased number of processes during apparatus assembly to attach the drive source, as well as ancillary wiring and piping therefor, and considerable time expenditures as well.

(3) The life of the drive source for mechanization greatly affects the apparatus as a whole. In particular, the drive source requires appropriate maintenance, repair, and replacement.

(4) The drive source for mechanization runs counter to the objective of a more compact apparatus.

(5) When the drive source for mechanization is an electric motor or hydraulic/pneumatic cylinder, it is difficult to drive the apparatus under reduced pressure conditions such as a vacuum.

The embodiment shown in FIGS. 30 and 31 of Patent Document 6 indicates the concomitant use of the prime mover of the feeder, as the drive source for the error correction means. This feature entails the prime mover of the feeder tensioning a guide member (pulley) around which is wound a medial portion of the linear body. The linear body tensed in this manner assumes a tensed state without slacking, and feed errors of the moving body do not arise. Consequently, the problems listed in the aforedescribed (1) to (5) can be solved by the error correction means concomitantly using the prime mover as indicated in Patent Document 6.

However, in the case of the prior art shown in Patent Document 6 (FIGS. 30 and 31), due to the existence of a considerable distance between one end of the feeder where the prime mover is situated and the other end of the feeder where the error correction means is situated, the manipulating power of the prime mover must be transmitted to the error correction means by an elongated tensioning linear body (wire), and therefore the initial elongation and elastic elongation of the tensioning linear body affect the error correction means. Specifically, whereas in terms of ensuring the accuracy of the feeder, elongation (the cause of error) must be eradicated from the forward-reeling linear body and the reverse-reeling linear body, comparable extension (error) occurs in the error correction means as well, making the error correction means unsuitable for a feeding apparatus.

Consequently, a feed error correction apparatus that can solve the problems listed in (1) to (5) above is needed, while meeting requirements such as high accuracy, simplicity of configuration, low cost, and the like.

In order to solve such problems, the present invention is to provide a feed error correction apparatus for use in a feeder of a design in which a moving body is prompted to travel by linear bodies, that can satisfy requirements as to controllability for the purposes of error correction, stability of the state of error correction, reliability of the state of error correction, safety of the system, demand responsiveness, space saving design, simplicity of configuration, ease of repair and inspection, low price, low running costs, establishment of automation, high feed accuracy with respect to the feed means, use under reduced pressure conditions, and reduced effects stemming from malfunction or life of the drive source.

Means to Solve the Problems

The invention according to a first means for solving the problems provides a feed error correction method for correcting error in feeding a moving body that moves reciprocatingly along a travel path, the error caused by extension of linear bodies during reciprocating motion of the moving body along the travel path, in a feeder in which a linear body for transmission of outbound power and a linear body for transmission of inbound power are connected to the moving body, the linear bodies being respectively held in reeling/unreeling fashion by a linear body manipulator, a guide unit for the linear bodies being movably arranged, the guide unit comprising a driven rotating wheel for engaging a medial portion of the linear body for transmission of outbound power and/or the linear body for transmission of inbound power, and the moving body performing reciprocating motion along the travel path through reeling and unreeling of both of the linear bodies during running of the linear body manipulator, wherein the feed error correction method is characterized in that the driven rotating wheel of the guide unit, upon reclining power from a rotation system of the driven rotating wheel, being pulled in a direction of tensioning the linear bodies and caused to tension the linear bodies, and once a load of a predetermined value or above bears upon the linear bodies, power from the rotation system to the driven rotating wheel is interrupted, so that the system for power transmission from the rotation system to the driven rotating wheel transmits power exclusively in a direction in which the linear bodies are pulled;

with the feeder in the running state, when the linear bodies experience extension of a predetermined value or above, one-way power for towing the linear bodies is transmitted from the rotation system of the driven rotating wheel through a power transmission system, the linear bodies being towed upon receiving transmission of the one-way power, whereby extension equal to or greater than the constant value is cancelled so that feed error relating to the moving body does not arise; and in a case in which, with the feeder in the running state, when the linear bodies are not extending or are extending within a permissible range, or the linear bodies are tensioned, cancelling slack of the linear bodies caused by the extension, transmission of power for towing of the wire bodes from the driven rotating wheel through the power transmission system is interrupted.

According to the aforedescribed correction method, the linear body for transmission of outbound power and the linear body for transmission of inbound power may be reeled and unreeled by either a single common linear body manipulator or two independent linear body manipulators; and there may be a single guide unit for the linear bodies, an intermediate portion of the linear body for transmission of outbound power and/or the linear body for transmission of inbound power being engaged by the driven rotating wheel of the guide unit.

The invention according to a second means for solving the problems provides a feed error correction apparatus for correcting error in feeding a moving body that moves reciprocatingly along a travel path, the error caused by extension of linear bodies during reciprocating motion of the moving body along the travel path, in a feeder in which a linear body for transmission of outbound power and a linear body for transmission of inbound power are connected to the moving body, the linear bodies being respectively held in reeling/unreeling fashion by a linear body manipulator, a linear body guide unit including a driven rotating wheel engaging a medial portion of the linear body for transmission of outbound power and/or the linear body for transmission of inbound power being movably arranged, and the moving body undergoing outbound motion and inbound motion along the travel path through reeling and unreeling of both of the linear bodies by running the linear body manipulator, wherein the feed error correction apparatus in a feeder is characterized in that the guide unit includes unit towing means for pulling the driven rotating wheel in a direction of tensioning the linear bodies;

power transmission means is furnished between the unit towing means and the rotation system of the driven rotating wheel;

the power transmission means includes a one-way transmission part for transmitting power to the unit towing means, exclusively in a direction in which the linear bodies are pulled; and the unit towing means includes a power transmission interruption part for interrupting transmission of power for pulling the linear bodies, when a load at or above a predetermined value is applied.

The linear body for transmission of outbound power and the linear body for transmission of inbound power may be held in reeling/unreeling fashion by either a single common linear body manipulator or two independent linear body manipulators.

Advantageous Effects of the Invention

The present invention provides the following advantageous effects.

(a) Creation of a state of tension by eliminating initial extension and elastic extension arising in linear bodies employed in a feeder is indispensable in terms of ensuring feed accuracy, and extension of this sort is eliminated through towing of the guide unit, which engages medial portions of the linear bodies, by the unit towing means, resulting in a tensioned state of the linear bodies. Once the cause of feed error (extension of the linear bodies) has been removed and the wired bodies are in a tensioned state, predetermined feed can be performed while maintaining high feed accuracy in the feeder while online. Moreover, this error correction for the purpose of maintaining accuracy is performed constantly when the guide unit is operating while the feeder is in the running state, whereby the feed accuracy of the feeder may be dramatically improved.

(b) One-way power for the purpose of towing the linear bodies is transmitted from the rotation system of the driven rotating wheel to the unit towing means through the transmission system, and the unit towing system receives the one-way power towing the linear bodies, whereby extension of the linear bodies can be relieved. Moreover, in a case in which, with the feeder in the running state, when extension of the linear bodies is not occurring, when the extension is within a permissible range, or the linear bodies are tensioned by the unit towing means to cancel slack of the linear bodies caused by the extension, the power transmission interruption part of the unit towing means interrupts the power for towing of the wire bodes transmitted from the driven rotating wheel to the unit towing means side through the power transmission system. Consequently, not only does slack caused by feed error of the linear bodies fail to occur, but excessive tension that can cause incidents of breakage fail to occur as well. The reason is that tension control of the linear bodies is performed properly in just proportion, affording good control of feed error correction. During running of the feeder, such well-controlled feed error correction is performed constantly, whereby a stable and reliable state of error correction may be ensured. Further, as excessive tension that can cause incidents of breakage is avoided, the safety of the system is ensured as well.

(c) The unit towing means, while receiving transmission of power from the driven rotating wheel side, promptly relives extension of the linear bodies when it has occurred, thereby improving responsiveness of feed error correction.

(d) The need for a drive source for the feed error correction means itself is obviated. The reason is that the drive source of the feeder is also used as the drive source for the feed error correction means as well. The feed error correction means need merely move the linear body guide unit equipped with the driven rotating wheel, to a slight extent in the direction of tensioning the linear bodies, making a large operating area unnecessary. The main component is a simple, compact structure exclusively for towing the guide unit. Consequently, the requirements of small size and space saving design are satisfied.

(e) Additionally, by omitting the drive source for the feed error correction means, equipment costs can be minimized, and initial costs reduced; moreover, the energy needed during running can be reduced, reducing the running costs.

(f) The relationship of the feeder and the feed error correction apparatus is that the feed means is the "master" and the feed error correction means is the "slave." The feed error correction apparatus constantly holds the linear bodies of the feeder at appropriate tension, thereby guaranteeing high feed accuracy of the feeder. When the feeder enters the running state (on state), the feed error correction device also enters the running state (on state), and when the feeder enters the idle state (off state), the feed error correction device also enters the idle state (off state), whereby on-off control of the feed error correction apparatus can be accomplished through on-off control of the feeder. This obviates the need for special means for automating the system, and running of the feed error correction apparatus can be switched on and off automatically, thereby reducing costs and enhancing convenience.

(g) In cases in which an ordinary typical electric motor or hydraulic/pneumatic cylinder is used as the drive source for towing (prime mover), it is difficult to use the apparatus under reduced pressure conditions such as a vacuum. When such a drive source is used, the drive source must be provided with an enclosure of sealed type by protective walls. In contrast to this, the feed error correction apparatus of the present invention, which lacks such a drive source, can be freely used even under reduced pressure conditions such as a vacuum.

(h) An apparatus having a drive source requires repair and inspection of the drive source, and both time and labor will be necessary for apparatus inspection; moreover, the life of the drive source greatly affects the apparatus as a whole. In contrast to this, the feed error correction apparatus of the present invention, which lacks such a drive source, obviates the need for repair and inspection of the drive source, and moreover has the advantage that the apparatus is unaffected by malfunction or the life of the drive source.

BRIEF DESCRIPTION OF THE DRAWINGS

FIG. 4 is a plan view, a front view, and left and right side views showing the apparatus of FIG. 1 in partial cutaway;

FIG. 8 is a plan view, a front view, and left and right side views showing a fourth embodiment of the present invention in partial cutaway.

BEST MODE FOR CARRYING OUT THE INVENTION

Figure 1:
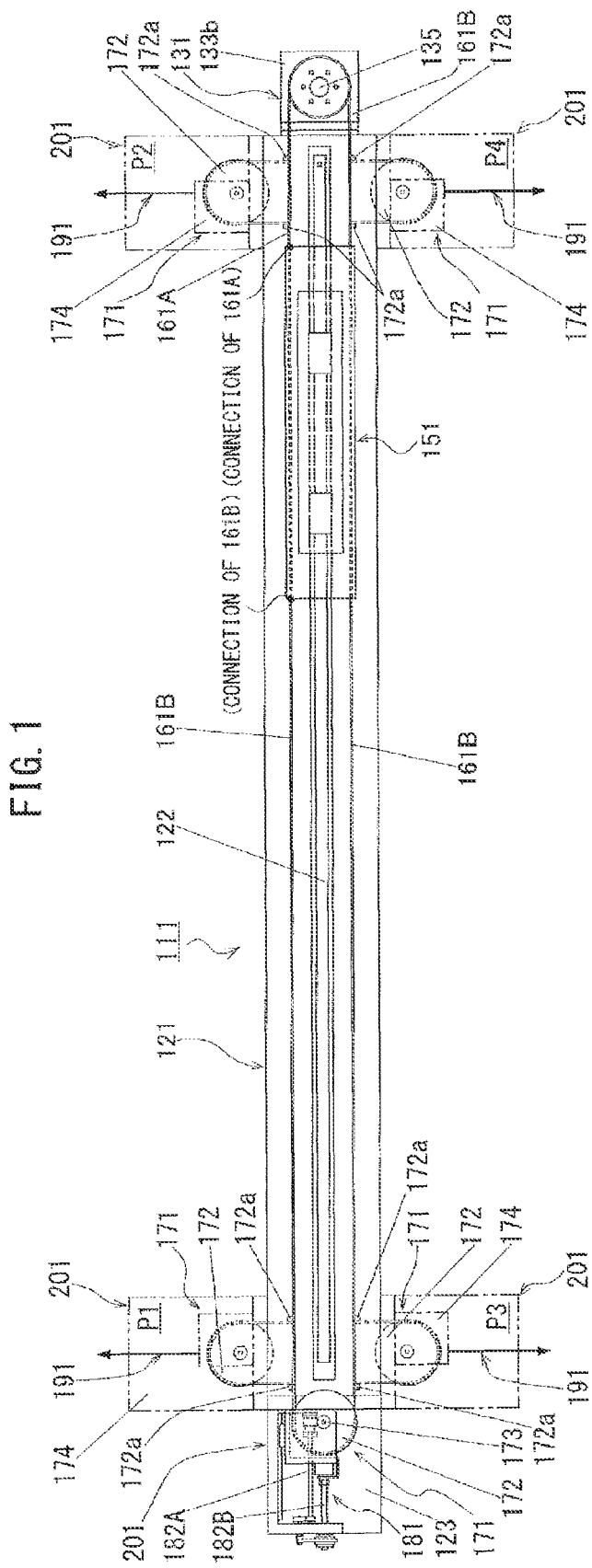
FIG. 1 is a simplified plan view of a first embodiment of the feed error correction apparatus according to the present invention.
Figure 2:
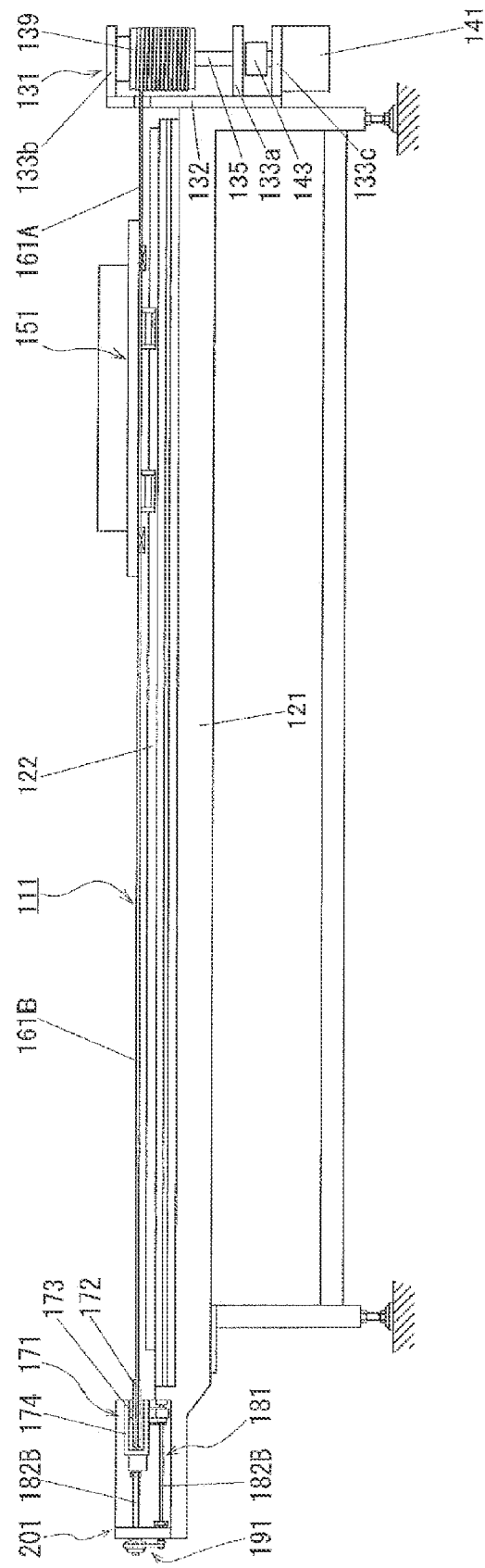
FIG. 2 is a front view of the apparatus of FIG. 1.

The embodiments of the feed error correction apparatus for a feeder according to the present invention will be described below on the basis of the accompanying drawings. FIGS. 1 and 2 show an example of a feeder 111 provided with the feed error correction means of the present invention. The configuration of the feeder 111 will be described first, followed by a description of the configuration of the feed error correction means.

The feeder 111 shown by way of example in FIGS. 1 and 2 is provided, as main constituent elements, with a travel path 121, a linear body manipulator 131, a moving body 151, two linear bodies 161A, 161B, and guide units 171 for guiding the linear bodies in predetermined directions. This feeder 111 is also provided with a feed error correction apparatus comprising unit towing means 191 for towing (or displacing) the guide units 171 in predetermined directions. In the feeder 111 of FIGS. 1 and 2, these are provided as single mechanical units.

The travel path 121 of the feeder 111 is formed of material having excellent mechanical characteristics, such as metal, synthetic resin, a composite material, or the like; in some cases, portions may be formed of rubber as well. To give a typical example, substantially all of the skeleton and major parts of the travel path 121 are formed of metal. As noted from FIGS. 1 and 2, the travel path 121, which extends in the right-left direction, comprises one or a plurality of rails 122 constituting, in the case of a single rail, monorail of known design, or in the case of a plurality of rails, parallel rails. The travel path 121 also serves as a support base located in the lowermost level of the feeder. This support base-type travel path 121 is constituted by an assembly of members such as framing members, panel members, and leg members.

Figure 3:
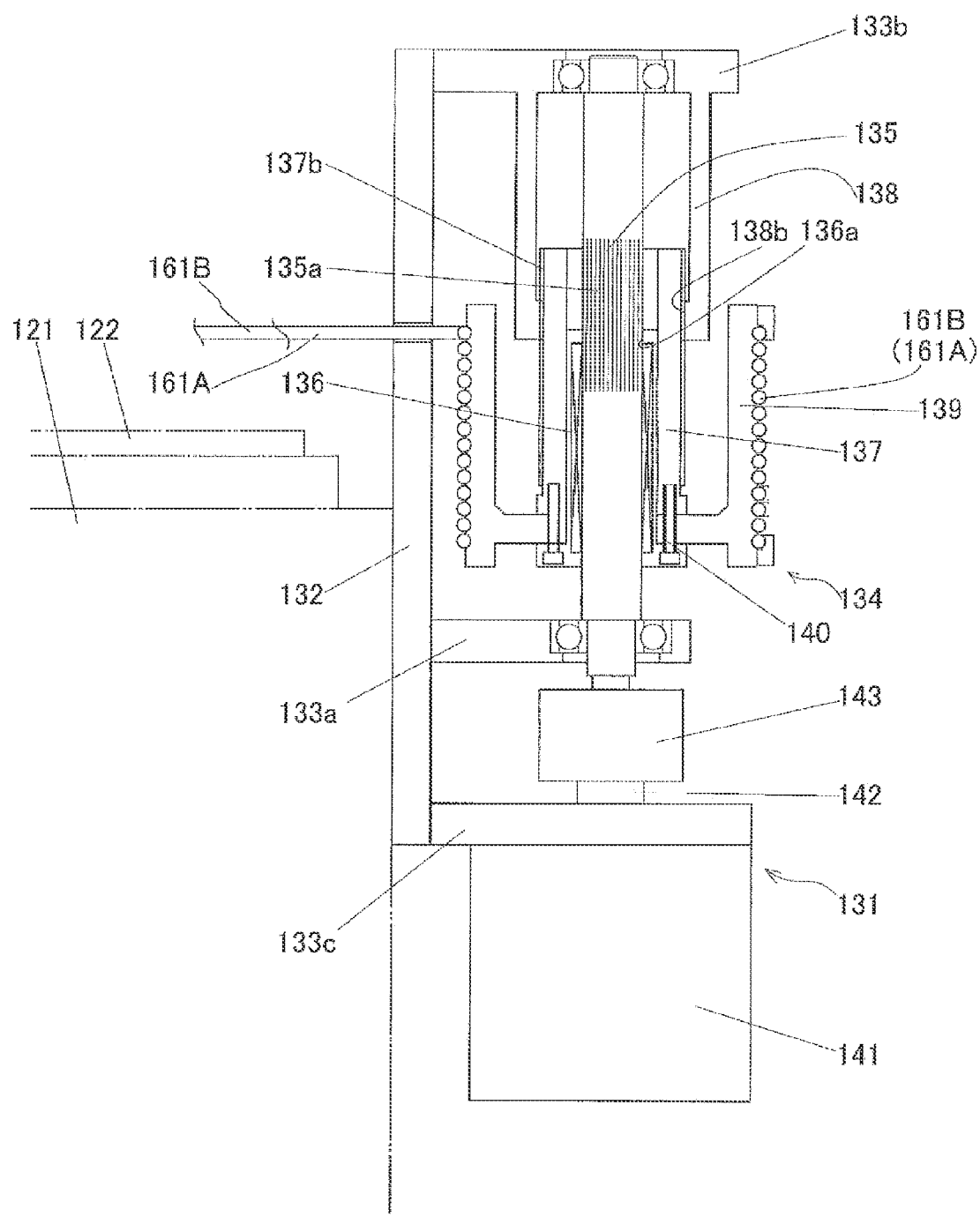
FIG. 3 is an enlarged fragmentary cross sectional view of the linear body manipulator of the apparatus of FIG. 1.

As noted from FIGS. 2 and 3, the linear body manipulator 131 of the feeder 111 is installed at one end of the travel path 121. More specifically, the linear body manipulator 131 is arranged to be secured at a predetermined location through the framing members, leg members, suspension members, a base member, or other mounting members of known design (not illustrated), so as to maintain a predetermined height. This linear body manipulator 131 may be a powered-type linear body winder provided with a winding drum (cylindrical shape) capable of rotation in forward and reverse directions, and of reciprocating movement in an axial direction, which may be any type. As one example, the linear body manipulator 131 of FIG. 3 may comprise an attachment base plate 132, a winder 134 capable of rotation in forward and reverse directions, a prime mover 141, and a coupling 143. The attachment base plate 132 includes a pair of bearing members 133a, 133b and an attachment member 133c, these being attached to a mounting member and extending in a horizontal direction from the base plate face, with predetermined spacing therebetween. The attachment member 133c is held spaced apart from the bearing member 133a. The winder 134 capable of rotation in forward and reverse directions is provided with five components assembled together coaxially (a spline shaft 135, a spline cylinder 136, a tube- or cylindrical-shaped male threaded shaft 137, a similarly tube- or cylindrical-shaped female threaded shaft 138, and a cylindrical winding drum 139). These five components have a concentric, multiple structure overlapping in a circumferential direction. Describing in more details, the spline shaft 135 is located at a center portion, the male threaded shaft 137 and the female threaded shaft 138 in a medial portion, and the winding drum 139 at an outermost peripheral portion. These five components respectively have the following relative arrangements. Spline uneven portions 135a formed on the outside peripheral face of the spline shaft 135 and extending in the axial direction, and spline uneven portions 136a formed on the inside peripheral face of the spline cylinder 136 and extending in the axial direction, constitute a mated spline through mating of the two sets of ridge-and-groove portions. A male thread 137b formed on the outside peripheral face of the male threaded shaft 137, and a female thread 138b formed on the inside peripheral face of the female threaded shaft 138, are threadedly engaged with each other through mating of the male and female threads thereof. Furthermore, the winding drum 139 and the female threaded shaft 138 are engaged inside to outside with each other without any interference therebetween. The spline cylinder 136 and the male threaded shaft 137, held at the aforedescribed position in a diametrical direction, are attached to the winding drum 139 by screws 140. Consequently, the three components of the spline cylinder 136, the male threaded shaft 137, and the winding drum 139 move in unison. The spline shaft 135 is rotatably supported at both spline shaft ends by a pair of bearing stands (also designated as bearing brackets) 133a, 133b having bearings of known design, with one end of the spline shaft 135 passing through one of the bearing members 133a. The three components at the outside periphery of the spline shaft 135 (the spline cylinder 136, the male threaded shaft 137, and the winding drum 139) are supported by the spline shaft 135. The female threaded shaft 138 is secured to the bearing member 133b so as to prevent rotation thereof, and protrudes out towards the winding drum 139 side. The winding drum 139 and the female threaded shaft 138 undergo reciprocating motion in the axial direction while the female threaded shaft 138 is guided in or out between the inside and outside peripheral faces thereof. The winding drum 139 rotates forwardly or reversely in the process. The prime mover 141 which is the drive source comprises a servo motor or pulse motor of known design, and has an output shaft 142 that rotates in unison with a motor rotor. The prime mover 141 is attached to the attachment member 133c, with the output shaft 142 thereof passing through the attachment member 133c and extending towards the spline shaft 135 side. Consequently, the winder 134 and the prime mover 141 face one another in close proximity on the same axial line as the spline shaft 135 of the winder 134 and the output shaft 142 of the prime mover 141. The coupling 143 couples the spline shaft 135 and the output shaft 142 to one another. The bearing members 133a, 133b are also designated as bearing brackets.

In the feeder 111 shown in FIGS. 1 and 2, the linear body manipulator 131 is installed at one end of the travel path 121 (the right end in FIG. 1), while the guide unit 171 is installed at the other end of the travel path 121 (the left end in FIG. 1). As shown in FIG. 4, the guide unit 171, which smoothly guides the travel of the linear bodies 161A, 161B in predetermined directions, includes a rotatable driven rotating wheel 172, a shaft 173, and a support member 174. The driven rotating wheel 172 is typically a pulley as illustrated (see FIG. 4), but may instead be a roller, sheave, capstan, or any member similar to these. The illustrated support member 174 has the form of a flattened box, formed of two (a pair of) wide wall face portions 174a, 174b and two narrow wall face portions 174c, 174d at right angles thereto, with the remaining two faces being open. Specifically, this support member 174 is open at two of its six faces. The pulley-type driven rotating wheel 172 is arranged such that a portion including a through-hole (shaft center hole) in a shaft center hole portion thereof lies within the support member 174, with the remainder being exposed to the outside of the support member 174. The driven rotating wheel 172 is rotatably attached to the wall face portions 174a, 174b of the support member 174 via the shaft 173 and the bearings. Specifically, the driven rotating wheel 172 and the pair of bearings are attached to the shaft 173, and outside peripheral portions of the two bearings are secured fitting into the wall face portions 174a, 174b of the support member 174. Consequently, the driven rotating wheel 172 rotates about the shaft 173 as its center. One end of the shaft passes through the wall face portion 174a of the support member 174 and protrudes to the outside.

Next, the assembled state of the guide unit 171, power transmission means 181, and the unit towing means 191 will be described, making reference to FIG. 4 (A) to (D).

In FIG. 4 (A) to (D), the guide unit 171, the power transmission means 181, and the unit towing means 191 are assembled onto a base member 201. In a typical example, the base member is made of metal, the base member 201 including two right-angled attachment support portions 202, 203, and a bearing stand 204 protruding from an inside face of one of the attachment support portions 202.

In the embodiment shown in FIG. 4 (A) to (D), the power transmission means 181, when assembled together with the guide unit 171, has the function of transmitting rotation of the driven rotating wheel 172 of the guide unit 171 to the unit towing means 191. The principal components of the power transmission means 181 are a first transmission shaft 182A, a second transmission shaft 182B, first to sixth transmission wheels 183a-183f, a one-way clutch 184, and a torque adjusting mechanism 194 (also called a torque adjusting-type rotation transfer mechanism). A pair of the transmission wheel 183a and second transmission wheel 183b may be transmission wheels of known design, such as magnet-type transmission rollers (magnetic friction-type transmission rollers), toothed gears, frictional transmission wheels, or the like. In the illustrated example, the first transmission wheel 183a and the second transmission wheel 183b are magnet-type transmission rollers. The two transmission wheels 183a, 183b of the magnet-type transmission rollers are a combination of known design including a magnetized member (a permanent magnet) and a magnetic body (iron); however, both may be magnetized. These wheels may be disposed in a state of contactless close proximity or in a contacting state, and when one of the transmission wheels (183a or 183b) rotates, the rotation thereof is transmitted to the other transmission wheel (183b or 183a) through the action of magnetic force. As noted from FIGS. 4 (A), (B), and (C), these transmission wheels 183a and 183b are arranged with the first transmission wheel 183a attached to an end of the shaft 173, and the second transmission wheel 183b attached to the first transmission shaft 182A. In this case, the first transmission shaft 182A is arranged in a direction orthogonal to the shaft 173 on the side of an end of the shaft 173, with both ends thereof rotatably supported via the two attachment support portions 203 of the base member 201 and the bearing of the bearing stand 204. Describing the relationship of the first transmission shaft 182A and the second transmission wheel 183b in more detail, a one-way clutch 178 is integrally secured fitting into an inside peripheral portion of the second transmission wheel 183b, this one-way clutch 178 corresponding to the first transmission shaft 182A. The one-way clutch 178 is of known design, for example, one for transferring forward rotation but not transferring reverse rotation, or one for transferring reverse rotation but not transferring forward rotation. Consequently, the second transmission wheel 183b which houses the one-way clutch 178 rotates in unison with the first transmission shaft 182A during normal rotation while idling about the first transmission shaft 182A during reverse rotation; or idles about the first transmission shaft 182A during reverse rotation while rotating in unison with the first transmission shaft 182A during normal rotation. The one-way clutch 178 can move freely in the lengthwise direction of the first transmission shaft 182A. Likewise, the second transmission wheel 183b which houses the one-way clutch 178 moves together with the one-way clutch 178. A pair of bracket-type coupling fittings 185X, 185Y slidably engaging the outside peripheral portions of the first transmission shaft 182A in such a way that the second transmission wheel 183b housing the one-way clutch 178 is held between both of the coupling fittings and one end of each of these coupling fittings is attached to the support member 174. These bracket-type coupling fittings 185X, 185Y at the other end thereof are secured to the one-way clutch 178, or not so secured. With the support member 174, the one-way clutch 178, and both of the bracket-type coupling fittings 185X, 185Y arranged in this relationship, during reciprocating motion of the one-way clutch 178 along the lengthwise direction of the first transmission shaft 182A, the support member 174 follows this motion as well. The second transmission shaft 182B arranged held in a coaxial state with respect to the first transmission shaft 182A is passed through the attachment support portion 203 of the base member 201 and rotatably supported via a bearing. A third transmission wheel 183c of pinion form attached to one end of the first transmission shaft 182A, and a fourth transmission wheel 183d of gear form attached to the other end of the second transmission shaft 182B, mesh with one another. To the other end of the second transmission shaft 182B is attached a fifth transmission wheel 183e of pulley (small pulley) form for the timing belt; and a transmission belt 186 serving as a timing belt is engaged about this fifth transmission wheel 183e and a sixth transmission wheel 183f of pulley (large pulley) form for the timing belt. The sixth transmission wheel 183f is furnished at the unit towing means 191 side; the transmission wheel 183f as well as the unit towing means 191 will be described below.

The support member 174 which rotatably supports the driven rotating wheel 172 of the guide unit 171 of FIG. 4 (A) to (D) undergoes reciprocating motion along the lengthwise direction of the first transmission shaft 182A, this being accomplished by a pair of female/male slide members 205, 206. In the illustrated example, one of the slide members 205 is an elongated straight rail, while the other slide member 206 has a slot through which the slide member 205 is threaded. The rail-type slide member 205 is attached to an inside face of the attachment support portion 202 of the base member 201, while the slot type slide member 206 is attached to an outside face of the wall face portion 174c (part of the support member 174) in opposition to the inside face of the attachment support portion 202. In this way, the two slide members 205, 206 are in slidable engagement relative to one another. The guide unit 171 including the driven rotating wheel 172 and the support member 174 can undergo reciprocating motion along the lengthwise direction of the slide member 205, through the agency of the two slide members 205, 206.

The unit towing means 191 shown in FIG. 4 (A) to (D) comprises a rod-shaped metal male thread 192 and a cylindrical metal female thread 193. The male thread 192 is attached to the support member 174, and to this end, an outside wall of the wall face portion 174d of the support member 174 is furnished with a joining portion 175 of protruding type in the form of a floating joint. A distal end portion of the rod-shaped male thread 192 is threaded into the joining portion (floating joint) 175 of the support member 174 in such a way as to compensate for decentering or machining errors. A holding member 176 is attached to the holding member 174, the holding member 176 restricting rotation of the male thread 192. Specifically, the male thread 192 is passed through the support member 176, this support member 176 holding the male thread 192 in such a way that it cannot rotate. The cylindrical female thread 193 is rotatably supported by a bearing fitted into the attachment support portion 203 of the base member 201, and one end thereof protrudes from an outside face of the attachment support portion 203. The two female/male threads 192, 193 have spiral ridge and groove formed on their inner/outer peripheral surfaces to mesh with each other. Furthermore, the sixth transmission wheel 183f of large pulley form for the timing belt mentioned above is attached about the outside periphery at one end of the female thread 193. In this case, the torque adjustment mechanism 194, such as a torque limiter of known design for example, is interposed between the outside peripheral face at the one end of the female thread 193 and the inside peripheral face of the sixth transmission wheel 183f. The torque limiter, which is the torque adjustment mechanism 194, in the commonly known manner, allows mutual slip between the components when rotational torque equal to or greater than a set value is applied to the female thread 193. Specifically, when torque equal to or greater than the set value occurs, the torque adjustment mechanism 194 interrupts transmission of rotation at the second transmission shaft 182B side to the female thread 193. In preferred practice, this torque adjustment mechanism 194 has high accuracy of torque interruption, to facilitate torque adjustment.

The guide unit 171, the power transmission means 181, and the unit towing means 191 on the base member 201 described with reference to FIG. 4 (A) to (D) are installed on a mounting base 123 furnished at one end of the travel path 121 in FIGS. 1 and 2. With these components installed on the mounting base 123, either one of the two linear bodies 161A, 161B is engaged by the driven rotating wheel 172 of the guide unit 171; in the example of FIGS. 1 and 2, the linear body 161B is engaged by the driven rotating wheel 172.

The feeder 111 of the embodiment shown in FIGS. 1 to 4 is employed for conveying or moving people and/or objects. Specifically, people and/or objects are conveyed over the travel path 121 (i.e., the rail 122) by the traveling (reciprocating) moving body 151, this conveyance being performed by operating the linear body manipulator 131. In more details, the winder 134 including the forward/reverse rotatable winding drum 139 undergoes forward rotation or reverse rotation under the power of the prime mover 141, the forward rotation or reverse rotation thereof causing either one of the two linear bodies 161A, 161B to be reeled up by the winding drum 139, while the other is unreeled from the winding drum 139. The moving body 151 is moved by the desired distance through this reeling and unreeling of the two linear bodies 161A, 161B in synchronous, tuned fashion. After moving by the desired distance, the moving body 151 is halted at a predetermined location by halting the prime mover 141. This feed operation is substantially identical to that disclosed in Patent Documents 1 and 2.

When feeding people and/or objects in this manner, in cases in which it is necessary for feeding to be performed in a highly accurate manner, it is crucial that influences stemming from extension of the linear bodies are eliminated as much as possible, as stated previously. According to the embodiment of the present invention in FIGS. 1 to 4, the influences of extension of both of the linear bodies 161A, 161B can be eliminated automatically, in association with starting up running of the feeder 111. The reason is that rotation of the prime mover 141 is transmitted to the driven rotating wheel 172 via the linear body 161B, and the rotational power of the driven rotating wheel 172 is transmitted to the unit towing means 191 via the power transmission means 181. This power transmission takes place as discussed below with reference to FIG. 4 (A) to (D).

During reciprocating travel of the moving body 151 over the travel path 121 while being conveyed in the aforedescribed manner, the driven rotating wheel 172 rotates forward. When the driven rotating wheel 172 rotates forward, the first transmission wheel 183a attached to the shaft 173 thereof rotates in the same direction, whereby the first transmission wheel 183a and the second transmission wheel 183b rotate as well. The one-way clutch 178 housed within the second transmission wheel 183b plays a crucial role in this regard. The one-way clutch 178 enters a state of meshing with the first transmission shaft 182A (a state in which power transmission is enabled) only when rotational power is transmitted in the forward direction from the forward-rotating driven rotating wheel 172 through the shaft 173, the first transmission wheel 183a, and the second transmission wheel 183b, the rotational power on the driven rotating wheel 172 side being transmitted to the first transmission shaft 182A, rotating the first transmission shaft 182A. Due to intermeshing of the third transmission wheel 183c on the first transmission shaft 182A and the fourth transmission wheel 183d on the second transmission shaft 182B, rotation of the first transmission shaft 182A is transmitted to the second transmission shaft 182B. Further, because the fifth transmission wheel 183e on the second transmission shaft 182B and the sixth transmission wheel 183f on the cylindrical female thread 193 are coupled through the transmission belt 186, rotation of the second transmission shaft 182B is transmitted to the cylindrical female thread 193. Because the torque adjusting mechanism 194 has been interposed between the female thread 193 and the sixth transmission wheel 183f, when rotation of the second transmission shaft 182B is transmitted to the female thread 193, the torque adjusting mechanism 194 also contributes to transmission of rotation. In this way, power is transmitted from the driven rotating wheel 172 to the female thread 193, via the shaft 173, the first transmission wheel 183a, the second transmission wheel 183b, the one-way clutch 178, the first transmission shaft 182A, the third transmission wheel 183c, the fourth transmission wheel 183d, the second transmission shaft 182B, and fifth transmission wheel 183e, the transmission belt 186, the sixth transmission wheel 183f, and the torque adjusting mechanism 194.

During forward rotation of the driven rotating wheel 172 of the guide unit 171, the female thread 193 rotates in the aforedescribed manner, and the unit towing means (or the unit displacing means) 191 is operated in the following manner, through rotation of the female thread 193.

In FIG. 4 (A) to (D), when the female thread 193 rotates through the power transmission path described above, the male thread 192 which is threadably mated with this female thread 193 moves towards the leftward direction in FIG. 4 (A) (the leftward direction in FIG. 1) while led by the female thread 193. The male thread 192 moving in the axial direction in this manner moves the support member 174 of the guide unit 171 in the same direction, and consequently the driven rotating wheel 172 is also moved (displaced) towards the leftward direction in FIG. 4 (A) (the leftward direction in FIG. 1). Because the linear body 161B is engaged about the driven rotating wheel 172, tensile load is applied on the two linear bodies 161A, 161B due this movement of the driven rotating wheel 172, and the pulling effect produced thereby brings the two linear bodies 161A, 161B into a state of appropriate tension free from slack. Once the two linear bodies 161A, 161B are held in a state of appropriate tension in this manner, predetermined feeding by reeling and unreeling the two linear bodies 161A, 161B takes place with high accuracy.

Once the two linear bodies 161A, 161B have been brought into a state of tension by the aforedescribed unit towing means, as the male thread 192 moves in the leftward direction in FIG. 4 (A), the degree of tension of the linear bodies 161A, 161B increases; however, the problem of excessive tensile force being brought to bear on the linear bodies 161A, 161B will be avoided automatically. The reason is that the torque adjusting mechanism 194 interposed between the sixth transmission wheel 183f and the female thread 193 interrupts the transmission of power. Specifically, when tensile force at or above a predetermined value is applied on the linear bodies 161A, 161B during this towing procedure, a large load is brought to bear on the female thread 193, giving rise to interruption of power transmission (non-transmission of rotation due to slip phenomena) by the torque adjusting mechanism 194 between the sixth transmission wheel 183f and the female thread 193, so that rotation at the driven rotating wheel 172 side ceases to be transmitted to the female thread 193 side. Consequently, the linear bodies 161A, 161B are guaranteed to be maintained in a state of appropriate tension that does not lead to an incident of breakage, without tensile force being held through unrestraint or loss of control.

The moving body 151 reciprocates over the travel path 121 in association with movement of the linear bodies 161A, 161B, during which time the driven rotating wheel 172 of the guide unit 171 rotates forward or rotates in reverse, the linear bodies 161A, 161B being held in the aforedescribed state of appropriate tension only during forward rotation of the driven rotating wheel 172. This takes place automatically, due to the one-way clutch 178 furnished within the second transmission wheel 183b. The one-way clutch 178 transmits forward rotation of the driven rotating wheel 172 to the first transmission shaft 182A, but during reverse rotation of the driven rotating wheel 172, does not mesh with the first transmission shaft 182A, so the reverse rotation is not transmitted.

The linear bodies 161A, 161B are subjected to tensile load through the aforedescribed manipulation performed automatically in association with running of the feeder 111. Initial extension and elastic extension occur in the linear bodies 161A, 161B when subjected to tensile load in this manner. As indicated in Patent Document 6 as well, when the amount of initial extension of a linear body is denoted as XE, and the amount of elastic extension of a linear body is denoted as ZE, the total amount of extension TE is given by [(TE)=(XE)+(ZE)]. In the illustrated embodiment, tensile load (static load) satisfying the expression [(XE)×5=(ZE)×1] is applied to the two linear bodies 161A, 161B. This means that the torque adjustment value of the torque adjusting mechanism 194 is set such that the amount of elastic extension (ZE) is approximately five times greater than the amount of initial extension (XE).

In the embodiment of FIGS. 1 to 4, when the feeder 111 is employed in feed operations under such parameters, even when initial extension occurs, slack does not arise in the linear bodies 161A, 161B (in particular the linear body towing the moving body 151), and the predetermined state of tension is maintained. As a result, problems such as longitudinal swing or lateral swing of the linear body do not occur in the linear bodies 161A, 161B during travel of the moving body 151. As a high degree of controllability can be ensured subsequent to travel of the moving body 151 for a predetermined distance, it can be brought to a halt at a target location within the range of permissible error.

Another embodiment of the method and device for feed error correction according to the present invention will be described below.

In the embodiment of FIGS. 1 to 4, the linear bodies 161A, 161B are held in state of appropriate tension through towing of the driven rotating wheel 172 arranged at an end of the feeding apparatus 111, with feed errors being corrected automatically thereby; however, the present invention is not limited to this arrangement. In FIG. 4. FIG. 4 (A) shows a plan view of the feed error correction means, while FIG. 4 (B) shows a front view of the feed error correction means; however, a mode that appears as shown FIG. 4 (B) in plan view would also be acceptable. For example, in the feeder 111 of FIG. 1, the driven rotating wheel for placing the linear bodies 161A, 161B in a state of tension, as well as the guide unit 171, the power transmission means 181, and the unit towing means 191 ancillary thereto, may be installed at any location. In this case, the driven rotating wheels 172 which are towed in order to tension the linear bodies may be assembled onto the base members 201 furnished along a long side of the travel path 121. In the process, the linear bodies 161A, 161B are engaged by the driven rotating wheels 172 through auxiliary driven wheels (guide sheaves) 172a (see FIG. 6). A single feeder 111 may be furnished with two or more sets of means for holding the linear bodies 161A, 161B in a state of tension and automatically correcting feed errors.

Figure 5:
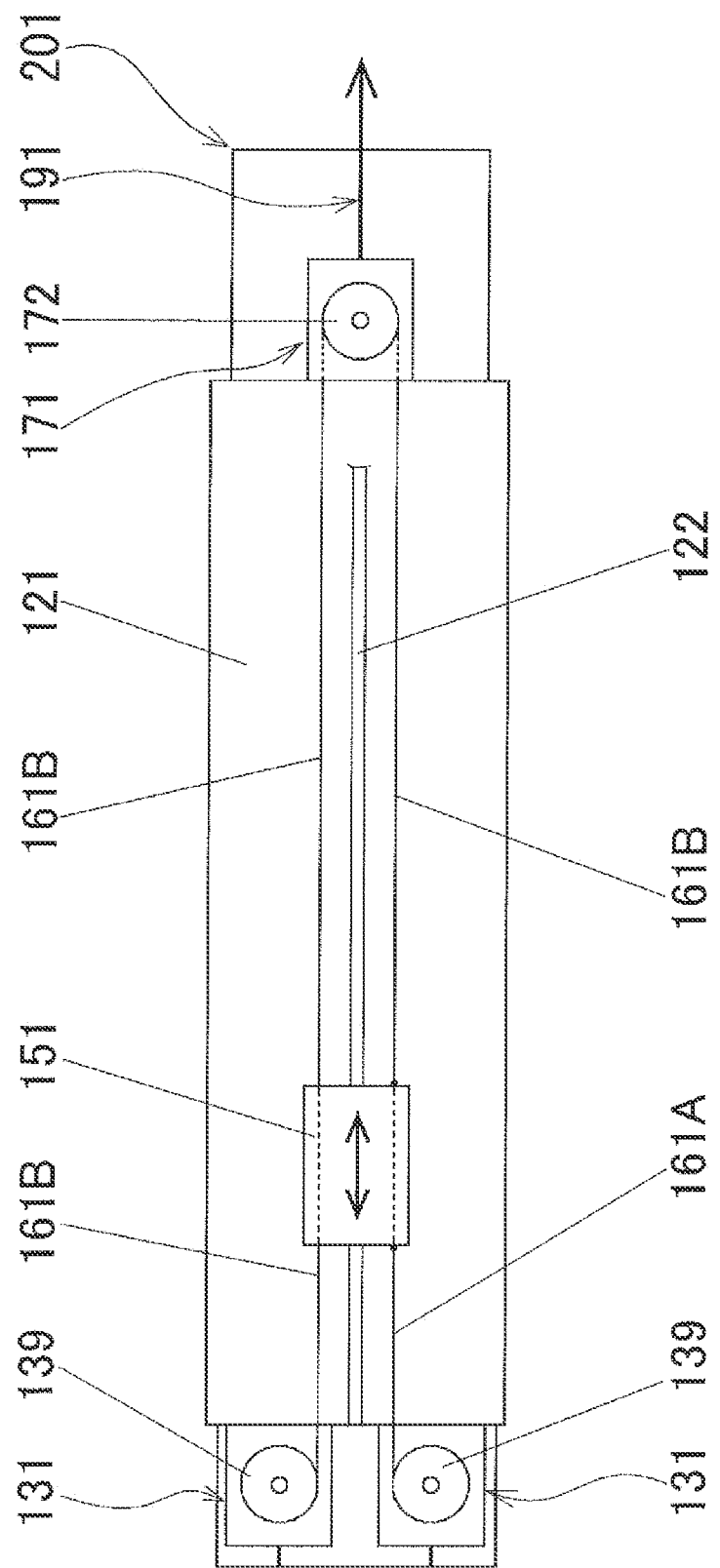
FIG. 5 is a simplified plan view of major parts of a second embodiment of the feed error correction apparatus according to the present invention.

In the embodiment shown in FIG. 5, the driven rotating wheel 172 is arranged at the other end of the travel path 121, and two mutually adjacent linear body manipulators 131 are arranged at a first end of the travel path 121. The error correction means described previously is furnished in correspondence with the driven rotating wheel 172 at the other end of the travel path 121. In the embodiment of FIG. 5, the feature of holding the linear bodies 161A, 161B in a state of tension and performing intended error correction is substantially identical to the case in the preceding example.

Figure 6:
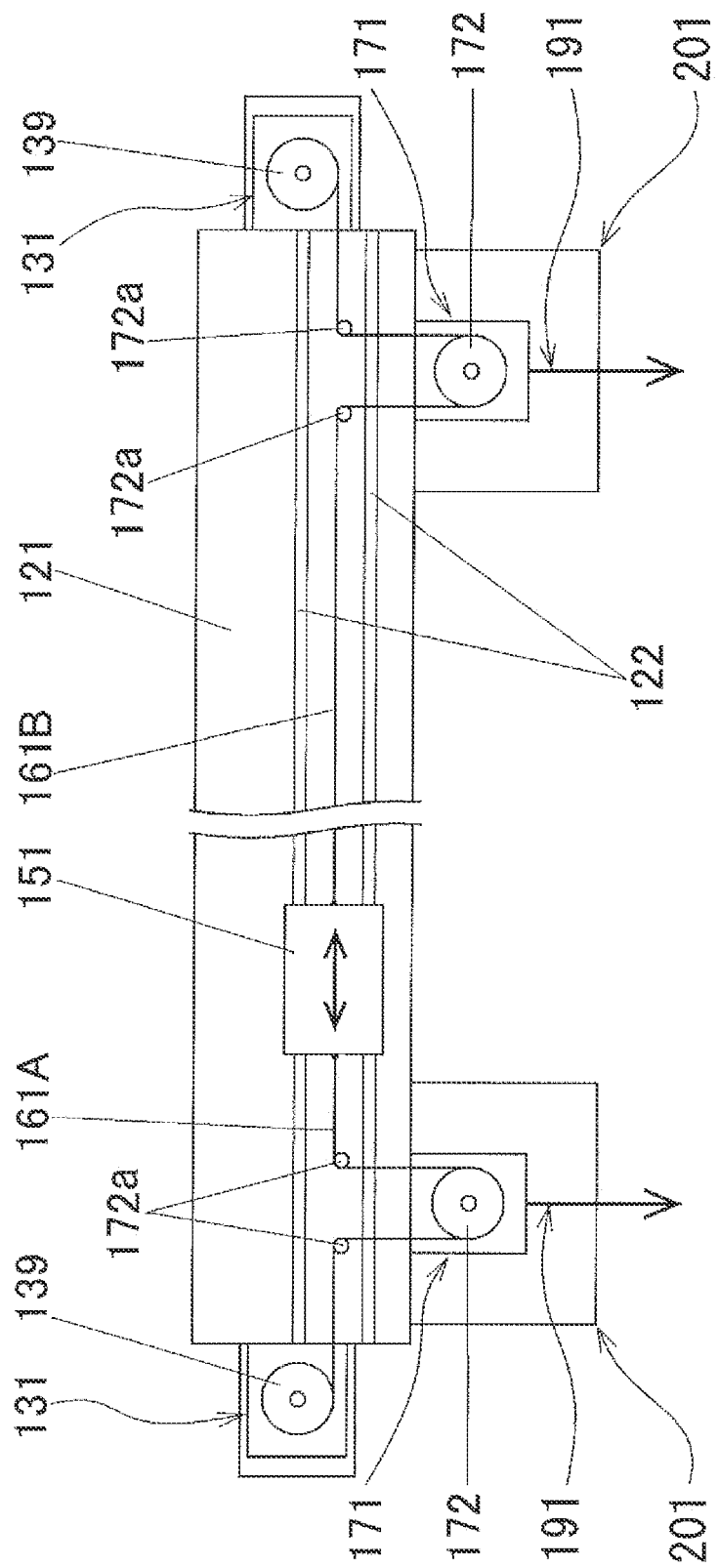
FIG. 6 is a simplified plan view of major parts of a third embodiment of the feed error correction apparatus according to the present invention.

The feeder 111 of the embodiment of FIG. 6 embodies a mode in which the linear bodies 161A, 161B are respectively reeled and unreeled by the two linear body manipulators 131 arranged at both ends of the travel path 121. According to this embodiment, reeling and unreeling of the linear bodies 161A, 161B by the linear body manipulators 131 are synchronized and tuned. The embodiment of FIG. 6 is likewise furnished with the previously described error correction means of a mode conforming to the embodiment of FIG. 5, the linear bodies 161A, 161B being held in a state of appropriate tension to correct feed errors automatically, in substantially similar fashion to the preceding embodiment.

Figure 7:
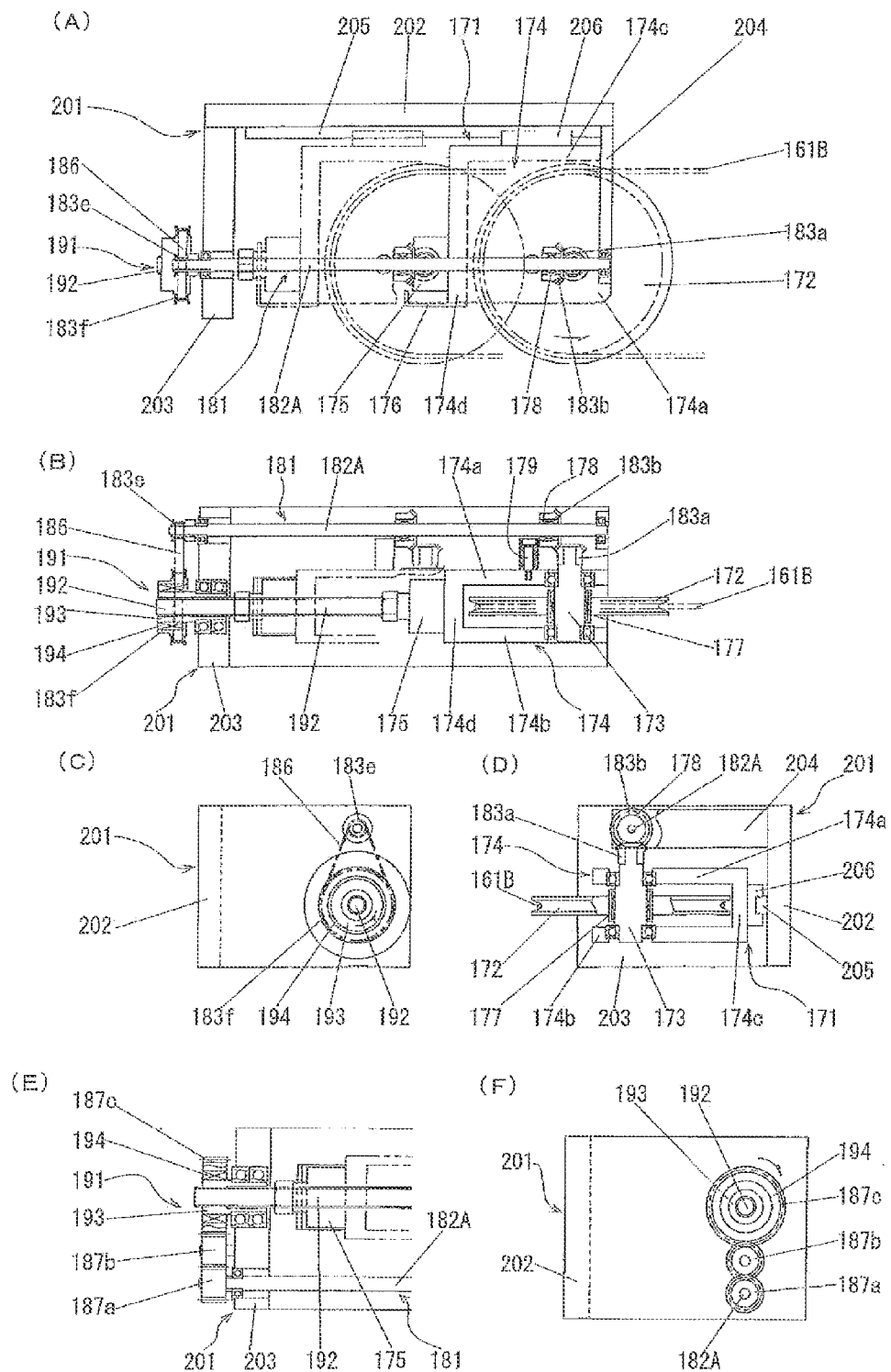
FIG. 7 is a plan view, a front view, and left and right side views showing the second and third embodiments of the present invention in partial cutaway, wherein the plan view and the left side view of the third embodiment are shown only in part.

Other embodiments of a feed error correction apparatus employed in the feeder 111 are shown in FIGS. 7 and 8.

The feed error correction apparatus shown in FIG. 7 is basically identical to that shown by way of example in FIG. 4, but differs from the embodiment of FIG. 4 in the following respects. A first point of difference is that the one-way clutch 177 is integrally secured fitting within an inside peripheral portion of the driven rotating wheel 172, the one-way clutch 177 corresponding to the shaft 173. This one-way clutch 177, for example, transmits rotation of the driven rotating wheel 172 to the shaft 173 only during forward rotation, and does not transmit rotation to the shaft 173 during reverse rotation of the driven rotating wheel 172. A second point of difference is that the first transmission wheel 183a and the second transmission wheel 183b comprise bevel gears; and the one-way clutch 178 is integrally secured fitting within an inside peripheral portion of the second transmission wheel 183b, the one-way clutch 178 corresponding to the first transmission shaft 182A. This one-way clutch 178, for example, transmits rotation of the second transmission wheel 183b to the first transmission shaft 182A only during forward rotation, but does not transmit rotation to the first transmission shaft 182A during reverse rotation of the second transmission wheel 183b. In the embodiment of FIG. 7, a contact-type regulating member 179 is attached to a support member, for the purpose of preventing shifting movement of the second transmission wheel 183b in an axial direction. Because the second transmission wheel 183b is a bevel gear, this regulating member 179 is provided with a roller that does not hinder rotation of the second transmission wheel 183b, this roller being placed in contact against the second transmission wheel 183b so as to perform predetermined regulation. Furthermore, the second transmission shaft 182B, the third transmission wheel 183c, and the fourth transmission wheel 183d have been omitted in the embodiment of FIG. 7. The fifth transmission wheel 183e, which forms a pair with the sixth transmission wheel 183f on the female thread 193 side, is attached about the outside periphery at an end of the first transmission shaft 182A passing through the attachment support portion 203 of the base member 201 and protruding out therefrom. In the embodiment of FIG. 7 as well, the transmission belt 186 is engaged about the two transmission wheels 183e, 183f.

In the feed error correction device of FIG. 7, with the feeder 111 in the running state and the driven rotating wheel 172 rotating, the rotation thereof is transmitted from the shaft 173 side to the female thread 193 side through the first transmission shaft 182A, whereby linear body towing action substantially similar to the aforedescribed arises, thereby holding the linear bodies 161A, 161B in a state of appropriate tension, and automatically correcting feed errors.

In the example of FIG. 7, in place of the one-way clutch 178 within the second transmission wheel 183b, spline grooves constituting a pair (for allowing movement in the axial direction, while inhibiting rotation in the circumferential direction) are formed on the inside peripheral surface of the second transmission wheel 183b and on the outside peripheral surface of the first transmission shaft 182A, the two spline grooves meshing with one another. Further, in the embodiment of FIG. 7, the system for transmitting power between the first transmission shaft 182A and the female thread 193 may be modified from the transmission belt system described previously, to a toothed gear system. In this case, as shown in FIGS. 7 (E) and (F), three toothed gears 187a, 187b, 187c are interposed between the first transmission shaft 182A and the female thread 193.

In the feed error correction device shown in FIG. 8, the feed error correction means of FIG. 7 has been partially modified, the system for transmission of rotation from the first transmission shaft 182A to the female thread 193 being configured as follows, to include a torque regulating function for transmitting, and interrupting transmission, of rotation.

In the embodiment of FIG. 8, an extending/retracting arm 211 and a swinging arm 231 are combined, a one-way clutch 217 and an eccentric member 218 being interposed between the first transmission shaft 182A and the extending/retracting arm 211.

The extending/retracting arm 211 shown in FIG. 8 includes a metal cylinder 212, a metal piston rod 213, a compression-resistant elastic element 214 such as a spring, a sealing member 215, such as a bushing, comprising a high-friction material, and a coupling fitting 216 comprising a "Y-shaped" link. The compression-resistant elastic element 214 and the piston side of the piston rod 213 are housed inside the cylinder 212, and the sealing member 215 is installed in the open end of the cylinder 212, forming an end cap extending into the cylinder from the open end. The illustrated sealing member 215 has a flange formed at one end of a cylindrical portion, the distal end side of the piston rod 213 being passed through the cylindrical portion of the sealing member 215 to protrude out from the cylinder 212. The compression-resistant elastic element 214 inside the cylinder 212 imparts to the piston rod 213 force pushing it in a direction out from the cylinder 212. The coupling fitting 216 is attached to the distal end of the piston rod 213. The extending/retracting arm 211 constituted in this fashion is attached about the outside periphery at one end of the first transmission shaft 182A in FIG. 8. The cylinder 212 is attached to the first transmission shaft 182A by being fit onto one end of the first transmission shaft 182A via a hole at the cylinder basal end. The one-way clutch 217 is secured fitting into the hole at the cylinder basal end. The ring-shaped eccentric member 218 at the basal end side of the cylinder 212 is secured fitting about the outside periphery at one end of the first transmission shaft 182A. Because the one-way clutch 217 situated at the basal end side of the cylinder 212 is fitted onto the eccentric member 218 situated about the outside periphery at one end of the first transmission shaft 182A, only forward rotation of the first transmission shaft 182A is transmitted to the cylinder 212, whereupon the extending/retracting arm 211 gives rise to the specific motion discussed below, through transmission of rotation over the eccentric member 218. In the extending/retracting arm 211, the one-way clutch 217 may be replaced by a bushing, but the one-way clutch 217 may be more preferable than the bushing in consideration of suppressing useless movement of the cylinder 212.

The swinging arm 231 shown in FIG. 8 includes an arm member 232 of curved shape made of metal, and a ring-shaped holding member 233 integrally coupled to the basal end of the arm member 232. A one-way clutch 234 is secured fitting within an inside peripheral portion of the ring-shaped holding member 233. This swinging arm 231 is fitted, via the holding member 233 provided with the one-way clutch 234, onto the female thread 193 which has been threaded about the outside periphery at one end of the male thread 192.

As shown in FIG. 8, the extending/retracting arm 211 situated at the first transmission shaft 182A side, and the swinging arm 231 situated at the female thread 193 side, are coupled to one another by pin fastening means that includes the coupling fitting 216, at the distal end of the extending/retracting arm 211 (the distal end of the piston rod 213) and the distal end of the swinging arm 231 (the distal end of the arm member 232).

In the feed error correction device of FIG. 8, power from the driven rotating wheel 172 is transmitted to the female thread 193 through the driven rotating wheel 172, the shaft 173, the first transmission wheel 183a, the one-way clutch 178, the extending/retracting arm 211, the swinging arm 231, and the one-way clutch 234. In this case, power is transmitted in the following manner between the transmission wheel 183a and the extending/retracting arm 211. Due to the presence of the eccentric member 218, having an amount of eccentricity e, at an outside peripheral portion of the first transmission wheel 183a, the cylinder 212 of the extending/retracting arm 211 has a stroke motion of [e×2] in the lengthwise direction thereof. In other words, the piston rod 231 and the cylinder 212 of the extending/retracting arm 211 extend and retract with the range [2e], whereby the extending/retracting arm as a whole experiences such extension and retraction. This extension and retraction of the extending/retracting arm 211 is transmitted to the swinging arm 231 coupled to this arm. For example, in FIG. 8 (E), as the extending/retracting arm 211 extends, the swinging arm 231 rotates in a counter-clockwise direction, and as the extending/retracting arm 211 retracts, the swinging arm 231 rotates in a clockwise direction. As the swinging arm 231 rotates in the counter-clockwise direction (forward rotation), this rotation is transmitted to the female thread 193 via the one-way clutch 234 inside the holding member 233, and therefore the male thread 192 is towed in a predetermined direction through rotation of the female thread 193. As the male thread 192 moves in the towing direction in this way, the support member 174 including the driven rotating wheel 172 moves in the same direction. This means that the linear body towing action described previously arises in the feed error correction device of FIG. 8 as well, and that the linear bodies 161A, 161B are held in a state of appropriate tension, with feed errors being corrected automatically. The swinging arm 231 for making these feed error corrections can perform predetermined towing while utilizing rotation which is either clockwise rotation or counter-clockwise. In the process, either a right-handed thread system or a left-handed thread system can be selected, as appropriate.

In the feed error correction device of FIG. 8, as the extending/retracting arm 211 retracts and the swinging arm 231 rotates in the counter-clockwise direction (reverse rotation), there is no transmission of rotation between the one-way clutch 234 inside the holding member 233 and the female thread 193, and therefore during reverse rotation of the female thread 193, the female thread 193 does not return in the counter-towing direction. Moreover, in the feed error correction device of FIG. 8, both of the linear bodies 161A, 161B are held in a state of appropriate tension, whereby when a towing load at or above a predetermined value is brought to bear on the female thread 193, power transmission to the swinging arm 231 side on the basis of extending/retracting motion of the extending/retracting arm 211 is interrupted. The reason is that the force on the extending/retracting arm 211 side is lower than the towing load on the female thread 193. In this case, in the extending/retracting arm 211, the compression-resistant elastic element 214 is pushed by the piston rod 213 into a compressed state. This means that an action equivalent to torque limiting arises in the extending/retracting arm 211. Through arbitrary setting of the compression-resistant characteristics (for example, the spring constant) of the compression-resistant elastic element 214 of the extending/retracting arm 211, the state of tension of the linear bodies 161A, 161B) the tensile load on the linear bodies 161A, 161B) can be brought to any desired state.

In the feed error correction devices of FIGS. 7 and 8, the linear bodies 161A, 161B of the feeder 111 can be held in a state of appropriate tension.

INDUSTRIAL APPLICABILITY

The feed error correction device and method according to the present invention concomitantly employ the drive source of a feeder for bringing about travel of a moving body through movement of linear bodies, as the drive source for the feed error correction device, and automatically hold the linear bodies 161A, 161B in a state of appropriate tension, whereby usefulness can be improved further at low cost, and industrial applicability is high.

EXPLANATION OF NUMERALS AND CHARACTERS

111 Feeder
121 Travel path
131 Linear body manipulator
134 Winder
141 Prime mover
151 Moving body
161A Linear body
161B Linear body
171 Guide unit
172 Driven rotating wheel
173 Shaft
174 Support member
177 One-way clutch
178 One-way clutch
181 Power transmission means
182A First transmission shaft
182B Second transmission shaft
183a First transmission wheel
183b Second transmission wheel
183c Third transmission wheel
183d Fourth transmission wheel
183e Fifth transmission wheel
183f Sixth transmission wheel
186 Transmission belt
191 Unit towing means (or unit displacing means)
192 Male thread
193 Female thread
194 Torque adjustment mechanism
201 Base member
202 Attachment support portion
203 Attachment support portion
204 Bearing stand

What is claimed is:

1. A feed error correction method for correcting error in feeding a moving body that moves reciprocatingly along a travel path, the error caused by extension of linear bodies during reciprocating motion of the moving body along the travel path, in a feeder in which a linear body for transmission of outbound power and a linear body for transmission of inbound power are connected to the moving body, the linear bodies being respectively held in reeling/unreeling fashion by a linear body manipulator, a guide unit for the linear bodies being movably arranged, the guide unit comprising a driven rotating wheel for engaging a medial portion of the linear body for transmission of outbound power and/or the linear body for transmission of inbound power, and the moving body performing reciprocating motion along the travel path through reeling and unreeling of both of the linear bodies during running of the linear body manipulator, wherein the method for correcting feed error in a feeder is characterized in that the driven rotating wheel of the guide unit, upon receiving power from a rotation system of the driven rotating wheel, being pulled in a direction of tensioning the linear bodies and caused to cause to tension the linear bodies, and once a load of a predetermined value or above bears upon the linear bodies, power from the rotation system to the driven rotating wheel is interrupted, so that the system for power transmission from the rotation system to the driven rotating wheel transmits power exclusively in a direction in which the linear bodies are pulled;

with the feeder in the running state, when the linear bodies experience extension of a predetermined value or above, one-way power for towing the linear bodies is transmitted from the rotation system of the driven rotating wheel through a power transmission system, the linear bodies being towed upon receiving transmission of the one-way power, whereby extension equal to or greater than the constant value is cancelled so that feed error relating to the moving body does not arise; and in a case in which, with the feeder in the running state, when the linear bodies are not extending or are extending within a permissible range, or the linear bodies are tensioned, cancelling slack of the linear bodies caused by the extension, transmission of power for towing of the wire bodes from the driven rotating wheel through the power transmission system is interrupted.

2. The feed error correction method according to claim 1, wherein the linear body for transmission of outbound power and the linear body for transmission of inbound power are reeled and unreeled by a single common linear body manipulator and/or two independent linear body manipulators.

3. The feed error correction method according to claim 1, wherein a single linear body guide unit is employed, an intermediate portion of the linear body for transmission of outbound power and/or the linear body for transmission of inbound power being engaged with the driven rotating wheel of the guide unit.

4. A feed error correction apparatus for correcting error in feeding a moving body that moves reciprocatingly along a travel path, the error caused by extension of linear bodies during reciprocating motion of the moving body along the travel path, in a feeder in which a linear body for transmission of outbound power and a linear body for transmission of inbound power are connected to the moving body, the linear bodies being respectively held in reeling/unreeling fashion by a linear body manipulator, a linear body guide unit including a driven rotating wheel engaging a medial portion of the linear body for transmission of outbound power and/or the linear body for transmission of inbound power being movably arranged, and the moving body undergoing outbound motion and inbound motion along the travel path through reeling and unreeling of both of the linear bodies by running the linear body manipulator, wherein the feed error correction apparatus of a feeder is characterized in that the guide unit includes unit towing means for pulling the driven rotating wheel in a direction of tensioning the linear bodies;

power transmission means is furnished between the unit towing means and the rotation system of the driven rotating wheel;

the power transmission means includes a one-way transmission part for transmitting power to the unit towing means, exclusively in a direction in which the linear bodies are pulled; and the unit towing means includes a power transmission interruption part for interrupting transmission of power for pulling the linear bodies, when a load at or above a predetermined value is applied.

5. The feed error correction apparatus of a feeder according to claim 4, wherein the linear body for transmission of outbound power and the linear body for transmission of inbound power are held in reeling/unreeling fashion by either a single common linear body manipulator or two independent linear body manipulators.

\* \* \* \* \*